May 19, 1959 E. McAFEE 2,887,002
SPRING METAL U-SHAPED ANCHOR
Filed Nov. 15, 1956

INVENTOR.
ERNEST McAFEE
BY
RICHEY, WATTS, EDGERTON & McNENNY
ATTORNEYS

United States Patent Office 2,887,002
Patented May 19, 1959

2,887,002

SPRING METAL U-SHAPED ANCHOR

Ernest McAfee, Cleveland, Ohio, assignor, by direct and mesne assignments, of one-half to Abraham Yalen and one-half to Rhoda Yalen, South Cleveland, Ohio Application November 15, 1956, Serial No. 622,400

1 Claim. (Cl. 85—2.4)

This invention is a continuation-in-part of a copending application filed by Ernest McAfee on February 18, 1954, Serial No. 411,158, entitled "Expansion Anchor" and now abandoned.

The present invention pertains to improvements in the expansion anchor disclosed in the aforesaid application, and to certain structural refinements therein.

The object of the invention resides in the provision of a spring metal U-clip embodying a pair of arms, each having a pair of shoulders therein designed for engagement with the wall of the bore within which the anchor assembly is mounted upon lateral distention of the arms through the retractive movement of a wedge sleeve threaded on a machine screw intermediate the arms.

Further objects of the invention reside in the provision of an expansion anchor which is economic of manufacture, efficient of operation, sturdy of structure, and susceptible of installation with ease and dispatch.

Other objects and advantages more or less ancillary to the foregoing, and the manner in which all the various objects are realized, will appear in the following description, which considered in connection with the accompanying drawings, sets forth the preferred embodiment of the invention.

Figure 1:
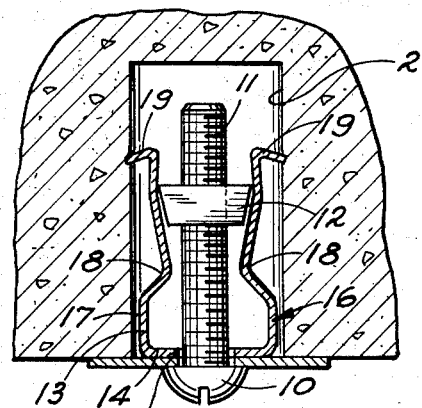
Fig. 1 is a vertical sectional view of the device mounted in a wall having a blind hole therein.
Figure 2:
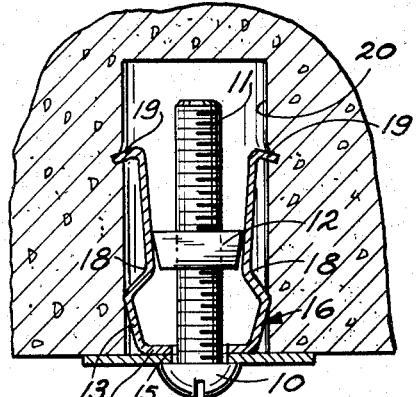
Fig. 2 is a similar view showing the expansion clamp in its actuated position.

Referring first to Figs. 1 and 2, the improved expansion anchor comprises a machine screw 10 of standard form embodying a round head, a threaded shank 11, a prismoidal wedge 12, and a spring metal U-clip 13 mounted on the screw adjacent the head thereof.

The U-clip is formed with a flat square end wall 14 having an opening 15 in the center thereof to receive the shank of the screw, an enlarged base portion 16 embodying vertical parallel side walls 17 bent inwardly towards the shank of the screw, then upwardly in parallel relation with the screw to define shoulders 18. The arms terminate with outwardly directed ears 19 for engagement with the walls of the bore 20 in the building structure.

The length of the U-clip 13 is proportioned relative to the length of the machine screw so the threaded end of the shank 11 will protrude beyond the ears 19 and thus support the wedge 12 before actuation of the screw in spaced lineal relation with the ears on the fingers. The diagonal dimension across the end wall of the U-clip is equal to the diameter of the bore 20 in the building structure, so the assembly of the screw, clip and wedge may be readily inserted in the bore when arms of the U-clip are in their normal unstressed form. In mounting an object upon a wall or similar structure, the workpiece, or object to be supported, is mounted on the screw intermediate the end wall of the clip and the head of the screw, and the assembly is then inserted in the bore 20 in a wall. The screw 10 is then tightened to draw the wedge inwardly and effect the distention of the arms of the U-clip and the engagement of the ears 19 with the wall of the bore 20. In order to assure positive fixation of the assembly, the screw is further rotated until the wedge engages the shoulders 18 and forces them into impinged relation with the bore.

Figure 3:
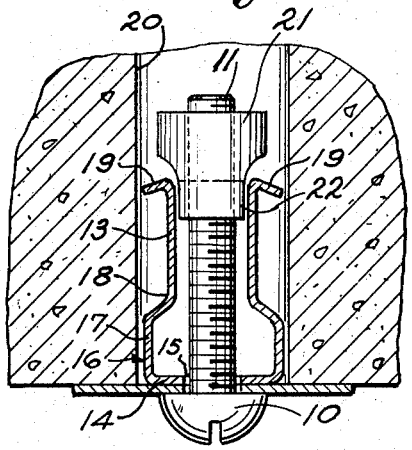
Fig. 3 is a sectional view of an alternate form of the improved expansion anchor in a wall having a blind hole therein.
Figure 4:
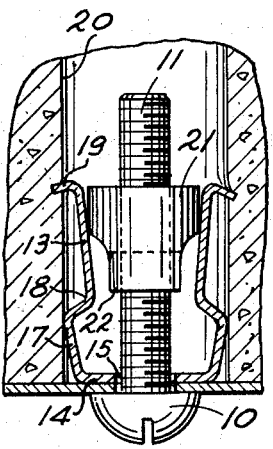
Fig. 4 is a similar view illustrating the expansion anchor in its actuated position.
Figure 5:
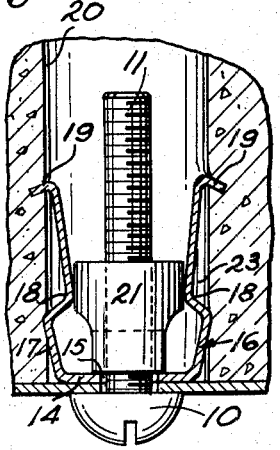
Fig. 5 is a similar view illustrating the wedge in a further retracted position.
Figure 6:
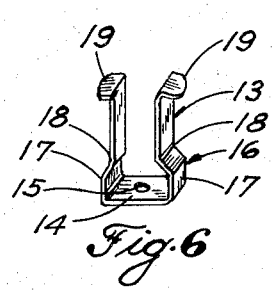
Fig. 6 is a view in perspective of the spring metal U-clip.
Figure 7:
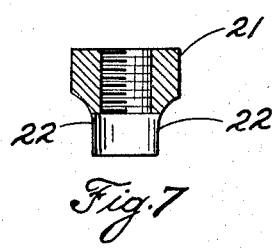
Fig. 7 is a transverse sectional view of the wedge sleeve.

As shown in Figs. 3 and 4, the U-clip 13 and screw are of the same general form as heretofore described, the wedge sleeve 21 in this case, however, is in the form of a cylindrical body drilled and tapped for the reception of the screw 10, and the body of the sleeve is further machined with flat parallel lands 22 on the lower end thereof. The lands are cut below the diameter of the bore so the arms of the clip rest upon the crest of the threaded shank of the screw. The milling cutters, used in machining the lands 22, are relatively large in order to provide broad sweeping curves between the lands and the cylindrical body of the wedge sleeve 21. As shown in Fig. 4, when the screw is rotated, the wedge 21 is drawn inwardly, the arcuate ends of the lands 22 deflecting the ends of the arms laterally and causing the ears 19 to engage the wall of the bore 20. When the wedge is drawn inwardly to a point beyond the ends of the arcuate ends of the lands, the upper cylindrical body of the wedge sleeve will engage the free ends of the arms and hold the ears in compressed relation with the bore. To assure the stability of the assembly, the screw may be further rotated to draw the wedge sleeve 21 downwardly until the upper cylindrical body thereof engages the shoulders 18 and effects a secondary clamping action of the U-clip arms. The form of the arms of the U-clip eliminates the possibility of the anchor rocking within the bore, as occurs in an anchor having a single point of contact, and in addition, provides a pair of opposed pockets 23 between the shoulders 18 and ears 19 which retain any loose material, such as chips or dust, that may break away from the bore in a plastered wall during the insertion of the assembly in the bore or initial adjustment of the screw.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

An expansion anchor comprising a spring metal U-shaped clamp embodying a flat base portion having an opening therein, a pair of parallel arms thereon disposed in spaced normal relation thereto, the length of said arms being approximately one-third the length of said clamp, a second pair of parallel arms integral with the first named arms and spaced closer together than the first named arms, the junction between the first and second arms defining shoulders, outwardly directed ears on the ends of said second named arms and normal thereto, the dimension across said ears being equal to the width of said base, a screw in said opening in said base, a head on said screw, a wedge nut on said screw, the larger end of said wedge nut engaging said second named arms and deflecting said second named arms outwardly to the maximum adjustment of said ears when said screw is tightened and the larger end of said wedge nut is drawn into engagement with said shoulders.

References Cited in the file of this patent

UNITED STATES PATENTS

| | | |
|---|---|---|
| 1,650,956 | Ogden et al. | Nov. 29, 1927 |
| 1,654,346 | Ogden | Dec. 27, 1927 |
| 1,753,183 | Johnson | Apr. 1, 1930 |
| 1,795,057 | Tomkinson | Mar. 3, 1931 |
| 2,083,956 | Lang | June 15, 1937 |

FOREIGN PATENTS

| | | |
|---|---|---|
| 410,789 | France | Mar. 22, 1910 |
| 331,334 | Great Britain | July 3, 1930 |
| 121,499 | Sweden | Apr. 20, 1948 |
| 1,066,780 | France | Jan. 20, 1954 |